Patented Apr. 20, 1943

2,316,825

UNITED STATES PATENT OFFICE 2,316,825 p-NITROBENZENE SULPHINAMIDE

Josef Vonkennel and Josef Kimmig, Kiel, Germany, assignors to Schering Corporation, Bloomfield, N. J., a corporation of New Jersey No Drawing. Application March 19, 1938, Serial No. 196,906. In Germany March 27, 1937

1 Claim. (Cl. 260—397.7)

This invention relates to the new compound p-nitrobenzene sulphinamide.

Hitherto nothing was known regarding the physiological activity of sulphinic acids or their derivatives. The astonishing observation has now been made that aromatic sulphinic acid amides which contain further substituents in the molecule in addition to the sulphinic acid amide group, constitute therapeutically active substances.

The manufacture of these compounds takes place according to the present invention in such a manner that the corresponding sulphinic acid halide is treated with ammonia or organic bases whereby the acid amide is formed. As particularly valuable substances have proved the hitherto unknown o- and p-sulphinic acid amides of nitrobenzene as can be obtained by reduction of o- or p-nitrobenzene sulphonic acid chloride to the corresponding sulphinic acid, conversion thereof for example with thionyl chloride into the corresponding sulphinic acid chloride and treatment of the acid chloride with ammonia or organic bases.

The following examples illustrate the invention:

Example 1

32 grams of p-nitrobenzene sulphochloride are dissolved in 600 ccs. of absolute ethyl alcohol. Instead of pure ethyl alcohol also ethyl alcohol which has been denatured with 1% methyl alcohol, insofar as it is free from water, can be used. Into the solution is allowed to drop in the course of an hour a solution of 36 grams of stannous chloride in 200 ccs. of absolute ethyl alcohol which contains 16 ccs. of 37% hydrochloric acid. In this operation the temperature should not rise above 35° C. The whole is now allowed to stand for 1 hour at room temperature. When this time has elapsed the reaction solution is saturated with excess of anhydrous sodium carbonate, about 100 grams, which has previously been well pulverised in a mortar. The whole is now again allowed to stand for 2-3 hours and then heated to boiling under a reflux condenser on the water bath for half an hour. It is then cooled and the solution filtered with suction from excess sodium carbonate and separated tin hydroxide. The clear yellow coloured filtrate is evaporated to dryness in vacuum, the temperature not being allowed to exceed 45° C. The contents of the flask freed from alcohol are now dissolved in 100-120 ccs. of distilled water and concentrated hydrochloric acid added until the solution reacts acid to Congo red. After rubbing with a glass rod there immediately separates the p-nitrobenzene sulphinic acid crystallising in beautiful flakes. Melting point 140° C., yield 50–60% of the theory. In sulphuric acid solution the acid decolourises the quantity of potassium permanganate corresponding to its constitution. It can be recrystallised from water and alcohol. The sodium salt is yellow coloured.

4 grams of p-nitrobenzene sulphinic acid are thoroughly dried in a desiccator. The acid thus treated is brought into a flask of 100 ccs. content having a ground glass neck and 30 ccs. of purest thionyl chloride introduced. The content of the flask is heated on the water bath for 30–40 minutes under a reflux condenser. The excess of thionyl-chloride is thereupon distilled off in vacuum at 60° C. The last residues of thionyl chloride are removed with an oil vacuum pump. There remains in the flask a yellowish-brown oil which on cooling solidifies with the separation of crystals. The separated crystallised sulphinic acid chloride is filtered with strong suction and washed with a little ether. The sulphinic acid chloride is very unstable being immediately hydrolysed with water to sulphinic acid. It fumes in the air. M. P. 68° C. yield 70%.

4 grams of p-nitrobenzene sulphinic acid chloride are dissolved in ether free from water and peroxide. Instead of the pure sulphinic acid chloride also the primarily produced yellowish-brown oil can be employed, but in that case the liquid must be filtered from any undissolved flakes. Into the slightly yellow coloured ethereal solution dry ammonia is passed. After 2-3 minutes there separates a beautiful coloured amorphous precipitate. After a strong stream of ammonia has been passed through for 15 minutes the separated precipitate is filtered off. It can be obtained crystalline from absolute alcohol. Colourless prisms of melting point 164° C. The sulphinamide thus produced is stable to boiling and can be recrystallised from hot water. Yield 40% of the theory.

Example 2 o-Nitrobenzene sulphinic acid is produced according to Glaasz Annalen der Chemie, vol. 380, page 313. 4 grams of o-nitrobenzene sulphinic acid are thoroughly dried in a desiccator and then treated in a 100 ccs. ground glass neck flask with 30 ccs. of purest thionyl chloride. The content of the flask is heated on the water bath for 30–40 minutes under reflux. The thionyl chloride is thereupon distilled off in vacuum at 60° C. The last residues of thionyl chloride are removed with the oil vacuum pump. In the flask remains a red brown oil which on cooling in an ice-common salt mixture can be obtained crystallised. The separated crystallised o-nitrobenzene sulphinic acid chloride is filtered with strong suction and washed with a little ether. It is very unstable. In water it is easily hydrolyzed to the corresponding sulphinic acid. It fumes in the air. Yield 60% of the theory.

2 grams of o-nitrobenzene sulphinic acid chloride are dissolved in ether free from water and peroxide. Instead of the pure o-nitrosulphinic acid chloride also the primarily produced oil can be employed directly. In the case of the o-compound it is very suitable to proceed from the oil, since the crystallised sulphinic acid chloride can only be obtained pure with large losses. Into the slightly yellow coloured ethereal solution dry ammonia is passed. After 2-3 minutes a beautiful white coloured amorphous precipitate is deposited. After a strong stream of ammonia has been passed through for 15 minutes the separated precipitate is filtered off. It is obtained crystalline from absolute alcohol. Colourless prisms. M. P. 150 C. Yield 50-60% of the theory. The amide can be recrystallised from water and alcohol and is stable to boiling. In water it is difficultly soluble, in alcohol somewhat more easily.

The aromatic sulphinic acids such as come into application for the reaction claimed can contain instead of the nitro group also other substituents, for example hydroxyl groups or groups which by hydrolysis can again be converted into the hydroxyl group, mercapto groups, carboxylic acid and sulphonic acid groups, amino, halogen, arsenic acid residues and others.

Instead of ammonia also other basic substances such as organic amines, pyridine and quinoline compounds and the like can be used in the reaction. These basic residues can likewise be substituted by suitable substituents. Thus for example from p-nitrobenzene sulphinic acid chloride with sulphanilic acid amide the corresponding sulphinic acid amide can be produced. As further examples of amines may be mentioned alkylamines, such as dimethylamine, glucosamine and aniline.

*Example 3*

The reduction of acetylaminobenzene sulphonic acid chloride, corresponding to the methods of the previous examples, for example with stannous chloride and hydrochloric acid, gives the acetylaminobenzene sulphinic acid which can be converted in an analogous manner into the acetylaminobenzene sulphinic acid amides from which by careful saponification, suitably in the presence of reducing agents, the aminobenzene sulphinic acid amides can be produced.

*Example 4*

55 grams of p-nitrobenzene sulphonic acid chloride are introduced into an alkaline sodium sulphite solution consisting of 2,126 grams of sodium sulphite dissolved in 250 cc. of water whereto 25 ccs. of 50% sodium hydroxide solution are added. The mixture is shaken in a shaking machine for half an hour and then filtered off whereupon 50 ccs. of 60% sulphuric acid are allowed to drop in. The p-nitrobenzene sulphinic acid crystallizes immediately and can be obtained in pure form by recrystallisation from water.

5 grams of dimethylamine dissolved in 50 cc. of absolute ether are allowed to drop into a solution consisting of 4.4 g. p-nitrobenzene sulphinic acid chloride obtained from the sulphinic acid, for instance, as described in the preceding examples and 100 ccs. of ether. The precipitate consisting mainly of dimethylamine hydrochloride is filtered off and the filtrate is allowed to stand for some time. After about 20 minutes the nitrobenzene sulphinic acid dimethyl amide which is washed for removing the adhering dimethylamine hydrochloride is then recrystallized from 50% alcohol. The amide having a melting point of 74° C. forms a hydrochloric acid salt which is insoluble in water but readily soluble in alcohol.

Having now particularly described and ascertained the nature of our said invention and in what manner the same is to be performed, we declare that what we claim is:

p-Nitrobenzene sulphinamide.

JOSEF VONKENNEL.
JOSEF KIMMIG.